US008200604B2

(12) United States Patent
Goetsch et al.

(10) Patent No.: US 8,200,604 B2
(45) Date of Patent: Jun. 12, 2012

(54) MULTI-PLATFORM BUSINESS CALCULATION RULE LANGUAGE AND EXECUTION ENVIRONMENT

(75) Inventors: Gordon Goetsch, Woodinville, WA (US); Steven L. Hoberecht, Seattle, WA (US); Baomin Li, Renton, WA (US); Kevin Schmidt, Issaquah, WA (US); Scott Sebelsky, Camano Island, WA (US); Peiyuan Yan, Bellevue, WA (US); Mark Yang, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 818 days.

(21) Appl. No.: 11/933,827

(22) Filed: Nov. 1, 2007

(65) Prior Publication Data
US 2009/0006301 A1    Jan. 1, 2009

Related U.S. Application Data

(63) Continuation-in-part of application No. 11/771,907, filed on Jun. 29, 2007, now abandoned.

(51) Int. Cl.
   *G06N 7/00* (2006.01)
(52) U.S. Cl. ............ 706/47; 706/52; 707/765; 707/766; 707/769; 717/106
(58) Field of Classification Search ............ 706/47, 706/52
   See application file for complete search history.

(56) References Cited

U.S. PATENT DOCUMENTS

| | | | |
|---|---|---|---|
| 5,548,754 A | 8/1996 | Pirahesh et al. | 1/1 |
| 5,590,324 A | 12/1996 | Leung et al. | 1/1 |
| 5,713,020 A | 1/1998 | Reiter et al. | 1/1 |
| 5,765,159 A | 6/1998 | Srinivasan | 707/102 |
| 5,875,333 A | 2/1999 | Fish et al. | 717/109 |
| 6,170,009 B1 | 1/2001 | Mandal et al. | 709/223 |
| 6,192,357 B1 | 2/2001 | Krychniak | 1/1 |
| 6,370,681 B1 | 4/2002 | Dellarocas et al. | 717/110 |
| 6,442,543 B1 | 8/2002 | Snodgrass et al. | 1/1 |

(Continued)

FOREIGN PATENT DOCUMENTS
WO      WO 02/46909      6/2002

OTHER PUBLICATIONS
IBM; "*Generate SQL queries based on DB2 Cube Views metadata*"; Jan. 26, 2006; http://www-128.ibm.com/developerworks/db2/library/techartcile/dm-0601dere/; 18 pgs.

(Continued)

*Primary Examiner* — Shyue Jiunn Hwa
(74) *Attorney, Agent, or Firm* — Merchant & Gould

(57) ABSTRACT

Computer-readable storage media, computer-implemented methods, and systems are disclosed for a multi-platform calculation rule language and its environment. A calculation rule, presented in an expression language and specifying one or more functions, is received. The expression language, for a plurality of different platforms, allows each of a plurality of functions to be expressed using a common syntax. A selected platform is identified on which the calculation rule is to be executed. The calculation rule is resolved to the attributes of the data model in the selected platform to apply the calculation rule to the data model. The calculation rule is executed by performing the one or more functions specified in the calculation rule, and the results from executing the calculation rule are reported.

19 Claims, 8 Drawing Sheets

U.S. PATENT DOCUMENTS

| | | | | |
|---|---|---|---|---|
| 6,578,028 | B2 | 6/2003 | Egilsson et al. | 1/1 |
| 6,601,233 | B1 | 7/2003 | Underwood | 717/102 |
| 6,629,094 | B1 | 9/2003 | Colby et al. | 707/4 |
| 6,631,519 | B1 | 10/2003 | Nicholson et al. | 717/169 |
| 6,738,975 | B1 * | 5/2004 | Yee et al. | 719/310 |
| 6,876,314 | B1 | 4/2005 | Lin | 341/50 |
| 7,003,560 | B1 | 2/2006 | Mullen et al. | 709/223 |
| 7,047,249 | B1 | 5/2006 | Vincent | 1/1 |
| 7,072,898 | B2 | 7/2006 | Bussler et al. | 1/1 |
| 7,080,092 | B2 | 7/2006 | Upton | 1/1 |
| 7,149,731 | B2 | 12/2006 | Dettinger et al. | 1/1 |
| 7,320,001 | B1 | 1/2008 | Chen | 707/100 |
| 7,542,990 | B2 | 6/2009 | Paval | 707/103 |
| 7,603,358 | B1 * | 10/2009 | Anderson et al. | 1/1 |
| 7,702,622 | B2 | 4/2010 | Li et al. | 707/3 |
| 2002/0026632 | A1 | 2/2002 | Fuchs et al. | 717/137 |
| 2002/0199168 | A1 | 12/2002 | Namito | 717/107 |
| 2003/0046061 | A1 | 3/2003 | Preston et al. | 704/9 |
| 2003/0084423 | A1 | 5/2003 | Clegg et al. | 717/105 |
| 2003/0149958 | A1 | 8/2003 | Baluja et al. | 717/106 |
| 2003/0167455 | A1 | 9/2003 | Iborra et al. | 717/105 |
| 2004/0015833 | A1 | 1/2004 | Dellarocas et al. | 717/106 |
| 2004/0139061 | A1 * | 7/2004 | Colossi et al. | 707/3 |
| 2005/0010565 | A1 * | 1/2005 | Cushing et al. | 707/3 |
| 2005/0066306 | A1 | 3/2005 | Diab | 717/108 |
| 2005/0165826 | A1 | 7/2005 | Ho et al. | 1/1 |
| 2005/0192922 | A1 | 9/2005 | Edlund et al. | 707/1 |
| 2005/0204340 | A1 | 9/2005 | Ruminer et al. | 717/123 |
| 2005/0210004 | A1 | 9/2005 | Focazio et al. | 1/1 |
| 2005/0251507 | A1 | 11/2005 | Woollen | 1/1 |
| 2006/0010058 | A1 | 1/2006 | D'Hers et al. | 705/35 |
| 2006/0095435 | A1 | 5/2006 | Johnson et al. | 1/1 |
| 2006/0109800 | A1 | 5/2006 | Vaillant et al. | 370/254 |
| 2006/0143193 | A1 | 6/2006 | Thakkar et al. | 1/1 |
| 2006/0167868 | A1 | 7/2006 | Zhang et al. | 1/1 |
| 2006/0235837 | A1 | 10/2006 | Chong et al. | 707/4 |
| 2007/0027904 | A1 | 2/2007 | Chow et al. | 707/102 |
| 2007/0078826 | A1 * | 4/2007 | Bozkaya et al. | 707/3 |
| 2007/0256055 | A1 | 11/2007 | Herscu | 717/115 |
| 2009/0006370 | A1 * | 1/2009 | Li et al. | 707/5 |
| 2009/0006409 | A1 | 1/2009 | Yang et al. | 1/1 |

OTHER PUBLICATIONS

Microsoft; *Microsoft Office PerformancePoint Server 2007*; Nov. 15, 2006; http://download.microsoft.com/download/3/8/f/38f66127-43b2-47b9-9b5b-07dbd3f85d1c/Overview.pdf, 2 pgs.

Oracle; "*PeopleSoft Enterprise Architecture*", Mar. 2006;1 http://www.oracle.com/technology/products/applications/peoplesoft_ent/PeopleSoft_enterprise_arch.pdf, 15 pgs.

Stratecast; "*Data Migration: The Often Overlooked Critical Path to OSS/BSS Consolidation*"; Oct. 2006; http://www-03.ibm.com/industries/telecom/doc/content/bin/IBM_Data_Migration_WP_%20vfinal.pdfserver; 17 pgs.

U.S. Official Action dated Oct. 6, 2010 in U.S. Appl. No. 11/933,827.

\* cited by examiner (BACKGROUND)

(BACKGROUND)

(BACKGROUND)

MULTI-PLATFORM BUSINESS CALCULATION RULE LANGUAGE AND EXECUTION ENVIRONMENT

RELATED APPLICATIONS

This application represents a continuation-in-part of co-pending U.S. Patent Application "METHOD AND SYSTEM FOR PERFORMING OPERATIONS ON DATA USING XML STREAMS," filed on Jun. 29, 2007, and issued application Ser. No. 11/771,907. The present application claims the priority and benefit of this application under 35 U.S.C. §120.

BACKGROUND

Within an enterprise, it is not unusual for the enterprise's data to be stored in different types of databases. For example, some of the enterprise's data may be stored in a relational database, such as a structured query language (SQL) database, while other data may be stored in a multi-dimensional database, such as an on-line analytical processing (OLAP) "cube," while still other data is stored using other systems. Different data may be stored in different systems for many reasons, including tradition, availability of software for one platform, performance considerations, reporting flexibility, and countless other reasons.

Users within an enterprise may want to access data stored in different systems. Unfortunately, accessing multiple different systems may be problematic, because each of the different systems may be accessible only through its own query and reporting language. For example, an SQL relational database is queried using an SQL query, while a multi-dimensional database may be queried using the Multi-Dimensional Expressions (MDX) query. Other systems will call for other languages. This is further complicated by the fact that, for traditional types of computation, such as arithmetic computation, one type of query language may be used for a particular platform, while, for financial calculations, another type of query language may be used on that same platform.

To access different systems, users typically have to be versed in each of the query languages. Even when seeking similar data from the different systems, an appropriate query will have to be created in each of the respective query languages in order to retrieve the desired data. The problem is further complicated by the fact that different query languages have different capabilities in terms of dealing with different types of hierarchies or their ability to be adapted to retrieve data for a different scope. Thus, even one skilled in different query languages may not be able to readily translate a type of query from one language to another, but will have to formulate new queries to address the limitations and capabilities of each of the different languages used. In addition, as arithmetic and financial calculations becomes more complex or more specialized, the more different will be the queries used to perform those calculations in each of the different systems.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computer-readable storage media, computer-implemented methods, and systems are disclosed for a multi-platform calculation rule language and its environment. A calculation rule, presented in an expression language and specifying one or more functions, is received. The expression language, for a plurality of different platforms, allows each of a plurality of functions to be expressed using a common syntax. A selected platform is identified on which the calculation rule is to be executed. The calculation rule is resolved to the attributes of the data model in the selected platform to apply the calculation rule to the data model. The calculation rule is executed by performing the one or more functions specified in the calculation rule, and the results from executing the calculation rule are reported.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in three-digit reference numerals refers to the figure in which the referenced element first appears.

DETAILED DESCRIPTION OF IMPLEMENTATIONS

This detailed description describes implementations of a multi-platform calculation rule language and its environment. Implementations of the present disclosure allow for creation of rules that are independent of the platform on which the rule will be executed, whether the platform is an SQL platform, a multi-dimensional platform, or another platform. In addition, through the use of variables and parameters, the rule can adapt to new sets of data and incorporate parameters set at runtime without having to create or modify the rule.

Operating Environments for a Multi-Platform Business Calculation Rule Language

Figure 1:
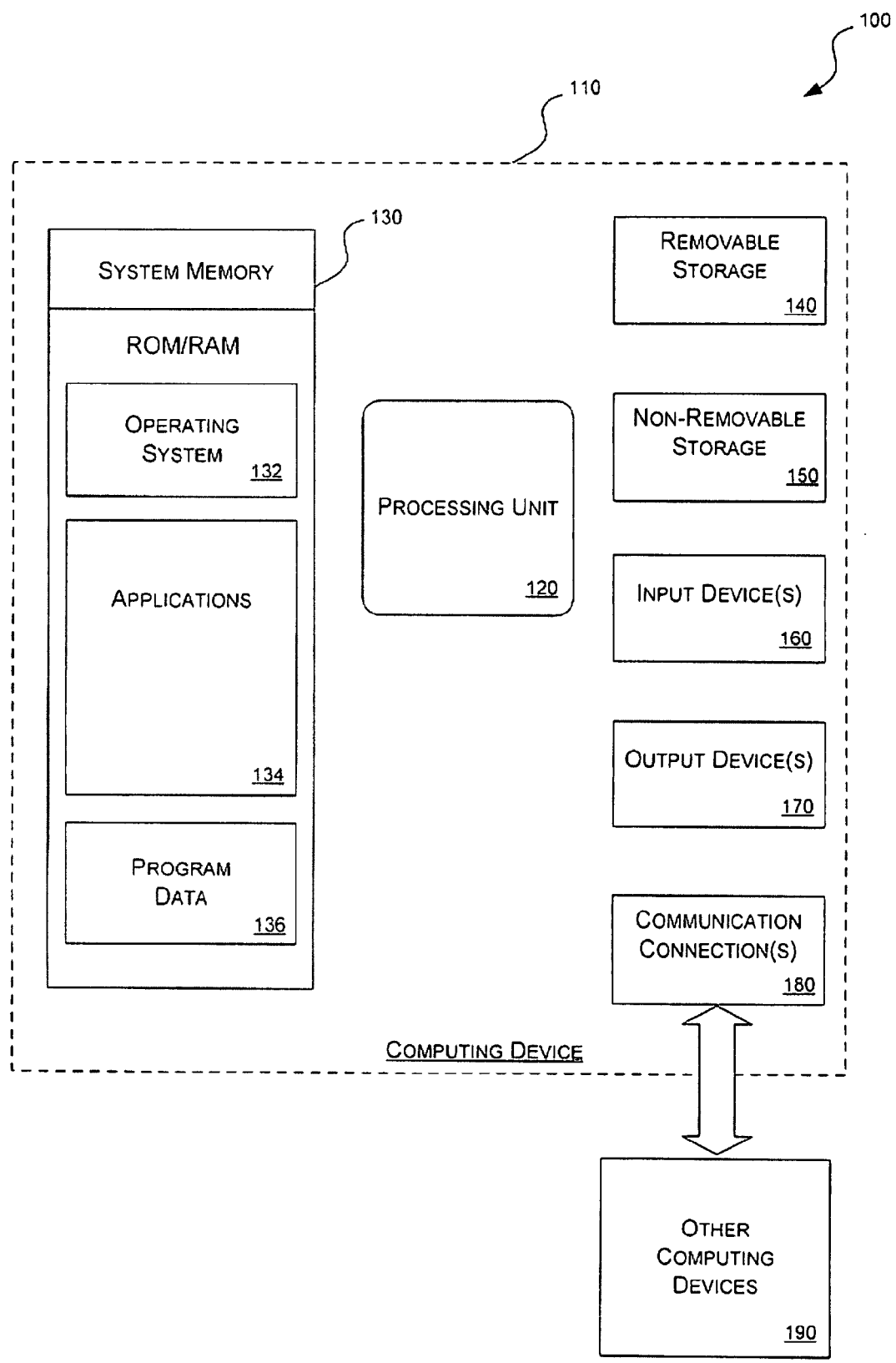
FIG. 1 is block diagram of an operating environment operable to support execution of computer-implemented methods and operate using computer-readable storage media as herein described.

Implementations of a multi-platform business calculation rule language may be supported by a number of different standalone and networked computing environments. FIG. 1 is a block diagram of a representative operating environment 100.

Referring to FIG. 1, an exemplary operating environment 100 includes a computing device, such as computing device 110. In a basic configuration, the computing device 110 may include a stationary computing device or a mobile computing device. The computing device 110 typically includes at least one processing unit 120 and a system memory 130. Depending on the exact configuration and type of the computing device 110, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140, and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also include one or more input devices 160 such as a keyboard, mouse, pen, voice input device, touch input device, etc. One or more output devices 170, such as a display, speakers, printer, etc., may also be included.

The computing device 110 also includes one or more communication connections 180 that allow the device to communicate with other computing devices 190, such as over a network or a wireless network. The one or more communication connections 180 represent an example of communications media. Communications media typically embody computer readable instructions, data structures, program modules, or other data in a modulated data signal such as a carrier wave or other transport mechanism, and include any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2:
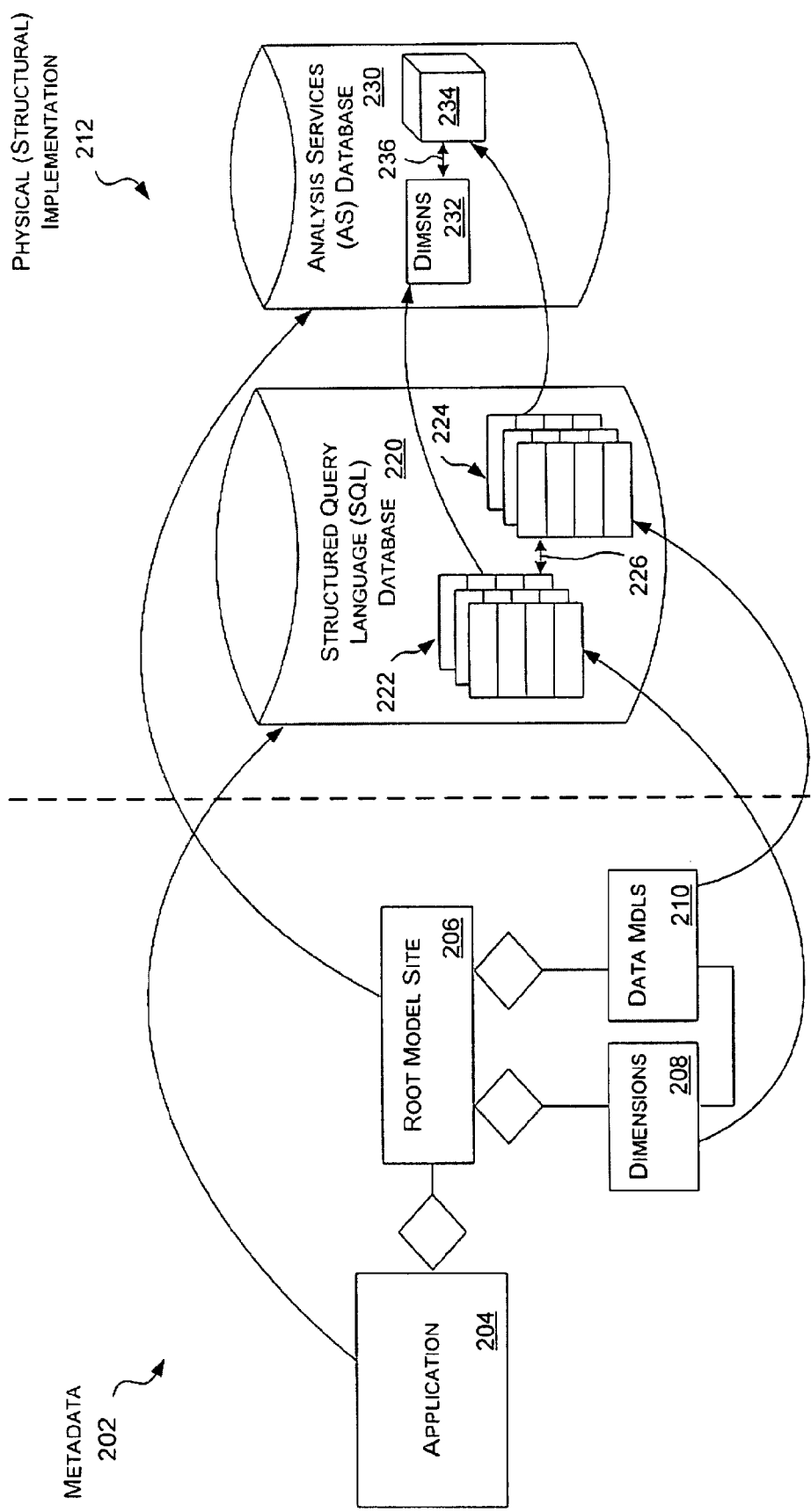
FIG. 2 is an example of an operating environment in which implementations of a multi-platform business calculation rule language may be used.

FIG. 2 illustrates an operating environment 200 adapted to take advantage of possible implementations of multi-platform business calculation rule language. The operating environment reflects an implementation of Microsoft Office 2007 PerformancePoint Server, which maintains data in both SQL and multi-dimensional databases.

In one implementation, such a system uses metadata 202 to describe an application 204. According to taxonomy of one implementation of a scalable application system, the application 204 includes a root model site 206 including a number of dimensions 208 and data models 210. According to one implementation, the taxonomy is implemented in a physical structure 212. The physical structure includes an SQL database 220 in which the dimensions 208 and the data models 210 of the root model site 206 are represented in the relational database 220 as a plurality of tables 222 and 224, respectively. Foreign key links 226 may join the table or tables 222 corresponding with the dimensions 208 to the table or tables 224 corresponding with the models 210.

In the implementation shown, contents of the root model site 206 are stored in a multidimensional database 230. The multidimensional database 230, in one implementation, is an Analysis Services (AS) database, such as can be managed by Analysis Services offered by Microsoft Corporation. In the multidimensional database 230, the dimensions 232 of the root model site 206 (stored as tables 222 in the relational database 220) are also stored as dimensions in the multidimensional database 230. The data models 210, also stored as tables 224 in the relational database 220, are stored in as a multidimensional structure 234, such as a data cube, in the multidimensional database 230. The dimensions 232 and the multidimensional data structure 234 are joined by links or keys 236 to associate the desired dimensions 232 with appropriate entries of the multidimensional structure 234.

The multidimensional database 230 is used for analysis and reporting, whereas the SQL database 220 serves as a master repository of all the application data and metadata. As previously described, however, analysis and reporting using the multidimensional database 230 may prove inefficient. Implementations of multi-platform business calculation rule language provide for efficient creation of business calculation rules that can be applied to both the SQL database 220 and the multi-dimensional database 230. As is also described below, using an implementation of a multi-platform business calculation rule language allows for rules to be used dynamically with different data models, without having to recode the rules for use in with different models or models that have been changed.

Figure 3:
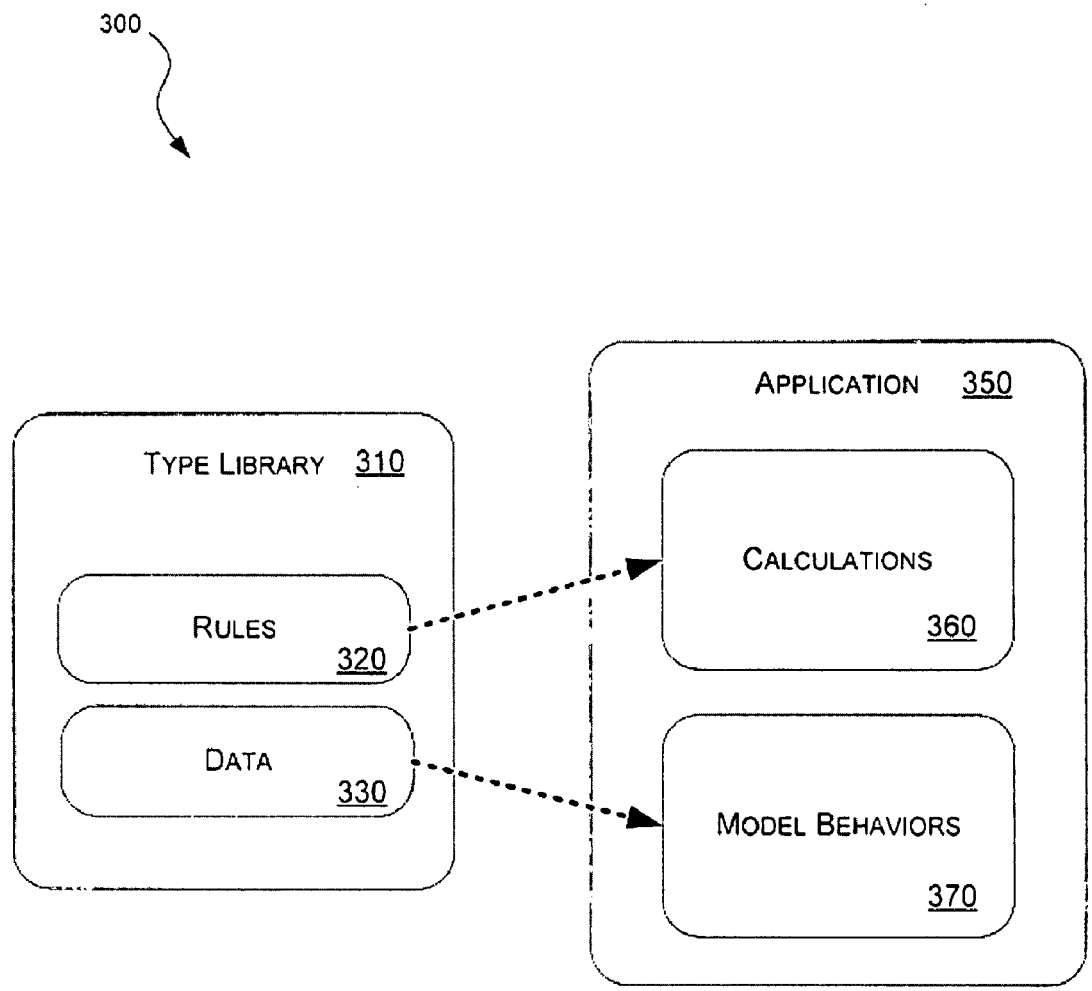
FIG. 3 is a block diagram of a type library used in an implementation of a metadata-based application deployment system.

One implementation of a multi-platform business calculation rule language takes advantage of a system 300 in which models are created from a type library 310 as shown in FIG. 3. The type library 310 includes a plurality of modifiable components from which an application 350 is derived.

The type library 310 includes a plurality of modifiable components that are adaptable to desired specifications to generate the application. The components of the type library 310 include definitions of rules and data structures manifested as rules types 320 and data types 330. From these types 320 and 330, calculations 360 and model behaviors 370, respectively are created. The types included in the type library 310 can be analogized to types used in programming languages in which designating a variable as being of a particular type, such as an integer type or a flow type, ascribes certain characteristics of that variable. In implementations of metadata-based application deployment, the types richly encapsulate all the potentially desired structures, behaviors, or other attributes associated with the functions the types are created to support to simplify the process of generating an application from these types.

The rules type 320 provides the basis for calculations 360 to be performed on data models. The rules types 320, for example, may include a range of computations that are used in business, such as present value calculations, exchange rate calculations, and other types of formulas. Correspondingly, the data types 330 may be used in creating model behaviors 370. For example, the data types 330 may define various types of members that are included in data models, and may include different types of accounts, units of time, and various other members that may be expected to be included in the application 350.

By creating calculations 360 and model behaviors 370 from the rules types 320 and the data types 330, respectively, of the type library 310, there is a correspondence between the form of the members in the data model and the calculations 370 that will be applied to the data models. Using these types simplifies the creation of calculation rules.

Specific Problems with Conventional Calculation Rule Languages

Conventional calculation rule languages tend to facilitate creation of calculation rules that are only useful with a specific data model for which the rules were created. Conventional rules are not easily adapted to accessing different data models, or even a same data model if the model has been updated, for example, to add new members to one of its dimensions. Problems with conventional calculation rule languages are illustrated in FIGS. 4A-4C.

Figure 4A:
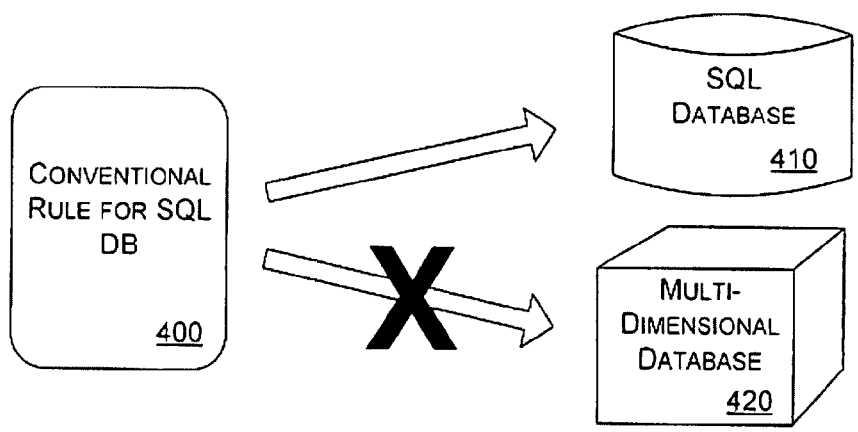
FIGS. 4A-4C are block diagrams illustrating the inability of conventionally-created calculation rules to operate with different or changed data models.
Figure 4B:
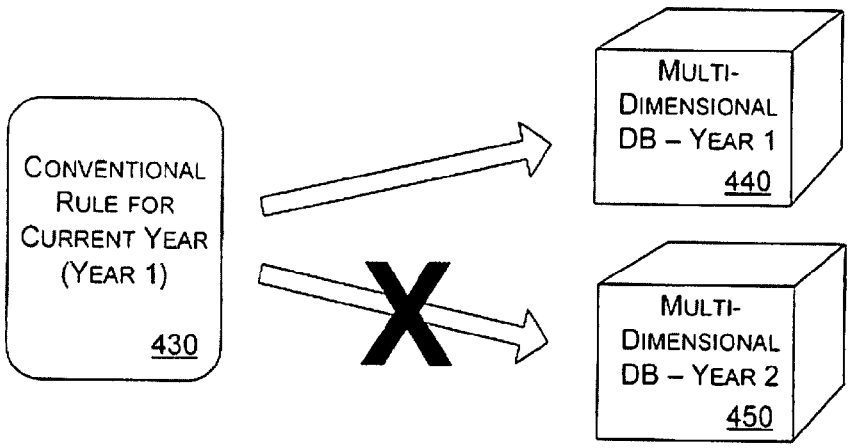
Figure 4C:
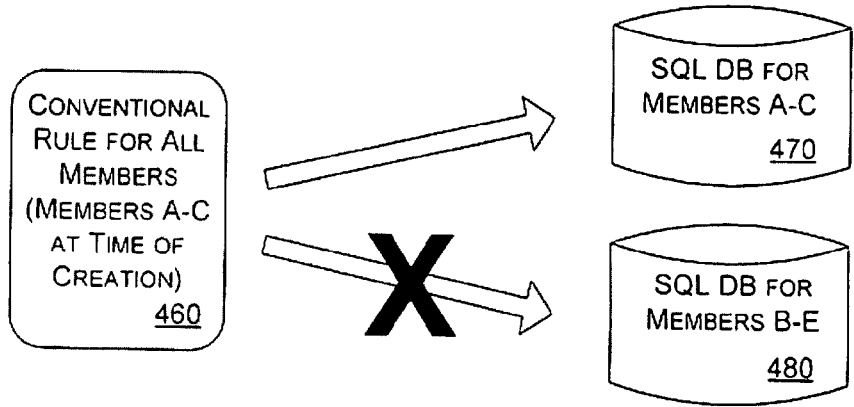

FIG. 4A shows a conventional calculation rule 400 created for a SQL database 410. Even if a user wished to apply the calculation rule 400 to a different type of database, such as a multi-dimensional database 420, the rule 400 would not work with the multi-dimensional database 420. Calculation rule languages are adapted for SQL databases, multi-dimensional databases, and other systems and are structured to use the types of data structures for which each was created. Thus, one cannot take a conventional SQL rule 400 and apply it to a different data structure. It is likely that a programmer versed in a multi-dimensional database language, such as Multi-Dimensional Expressions language (MDX), would have to code new calculation rules to be able to operate against the multi-dimensional database 420.

Not only are conventional calculation rules not portable between different data structures, but they may have to be rewritten or revised for use with a new set of data. FIG. 4B shows a conventional calculation rule 430 created to perform a calculation on data regarding members in a multi-dimensional database 440 for the current year, Year 1. Conventional calculation rule languages will specify the precise year as a member of the database from which data will be drawn. In other words, the conventional rule 430 will be defined literally in terms of retrieving and operating on data for "Year 1." As a result, if one wanted to perform an analogous calculation next year, for Year 2, using the multi-dimensional database for Year 2 450, the rule would have to be rewritten or revised—a rule defined in terms of "Year 1" 430 will not be able to work with a database for Year 2 450.

Finally, rules created in conventional calculation rule languages may also have to be rewritten to incorporate new data added as new members even in a database that is otherwise the same. FIG. 4C shows a calculation rule 460 created in a conventional calculation language that performs a calculation for members A-C. At the time the rule 460 was created, members A-C may have represented the complete list of members, with the rule being intended to encompass all the members in the database. Such a calculation rule should operate as expected on a database, such as database 470, where members A-C are all the members. However, for example, if member A were later deleted and new members D and E were later added, as in the case of database for members B-E 480, the previously created calculation rule will not operate correctly to yield a result for all of the members. The conventionally-created rule expressly recited members A-C. Because the rule 460 was hard-coded to members A-C, will not be able to correctly perform operations for what now constitutes all the members. To change the rule, a programmer may have to be assigned to update the rule 460, and be re-assigned to update the rule every time a member is added to the database 480.

Implementations of a Multi-Platform Calculation Rule Language and Environment

Figure 5:
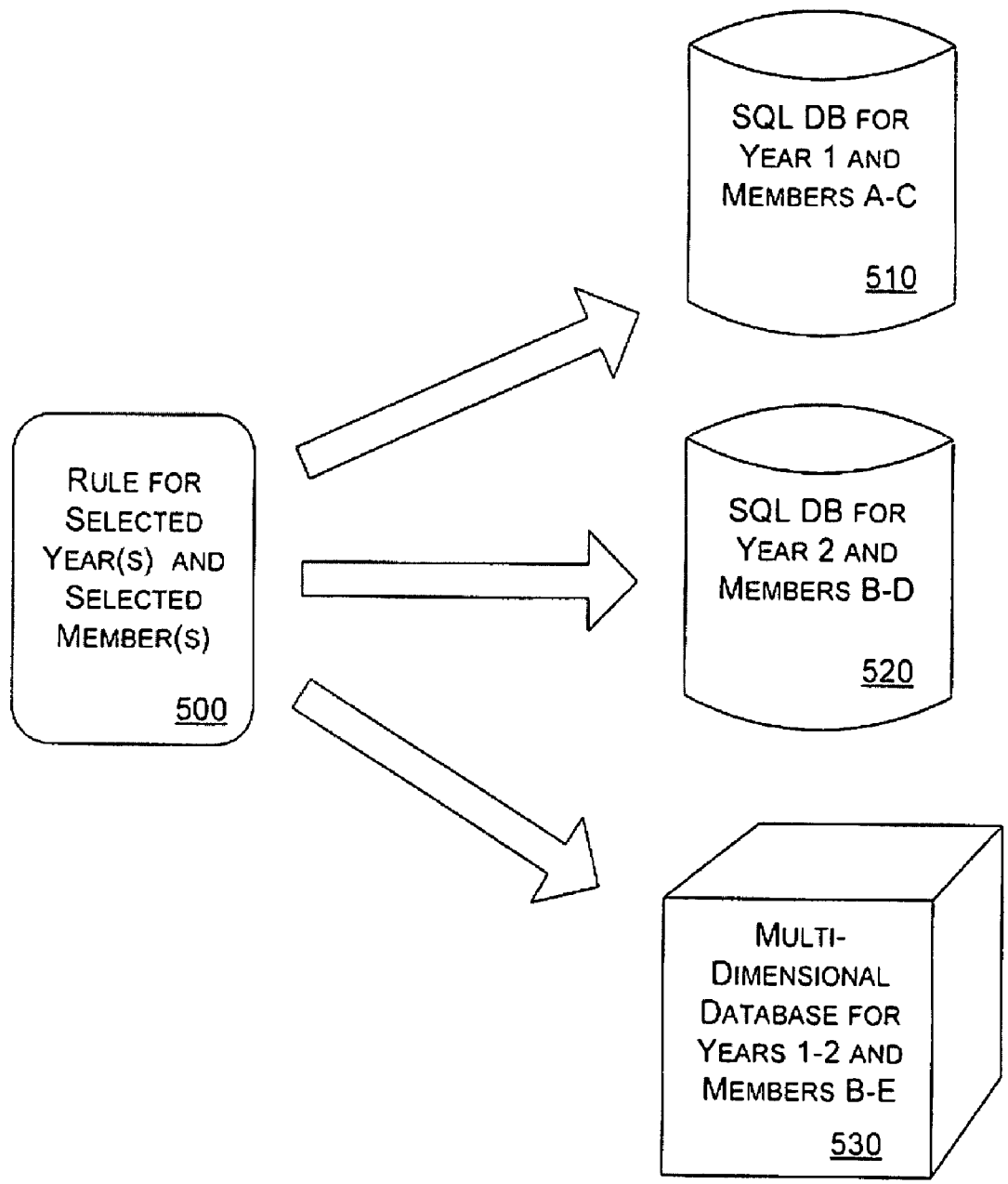
FIG. 5 is a block diagram illustration illustrating how a rule created using multi-platform business calculation rule language can engage different data models.

Implementations of a multi-platform business calculation rule language and a supporting environment resolve the concerns with conventional calculation rule languages, such as the problems described with reference to FIGS. 4A-4C. FIG. 5 illustrates a rule 500 created using an implementation of a multi-platform business calculation rule language. The rule 500 is directed to performing a calculation for a specified current year and for specified members. In the examples of FIGS. 4A-4C, the rules 400, 430, and 450 were hard-coded to different types of databases, spanned different time periods, or included different members, respectively. By contrast, the rule 500 can be adapted to apply to different types of databases, different periods, or different sets of members.

According to implementations of the present disclosure, the rule 500 may be applied to a SQL database 510 that includes data for year 1 and data for members A-C. The rule 500 can provide a correct result from the SQL database 510. In addition, the rule 500 can be applied to a SQL database 520 that includes data for year 2 and data for members A-D. Admittedly, if the rule developer employed adequate forethought to specify an SQL-based rule that was not hard-coded to a particular year or an enumerated set of members, a conventional rule may have been created that also could have yielded a correct result for all of the members. However, even with such foresight, no conventional rule configured to operate on a SQL database that was hard-coded also be applied to multi-dimensional database 530 that includes data for multiple years and for a different set of members. According to implementations of the present disclosure, a rule may be generated and successfully applied to generate a correct result from multi-dimensional database 520 that includes data for a different period, such as years 1 and 2, and for a set of members including members B-E.

To be usable—and reusable—with databases having different numbers of members, for different periods, and even in different structures, is both an objective and a benefit of implementations of the multi-platform calculation rule language and its environment. For example, in the environment of FIG. 2 in which data is maintained in both SQL and multi-dimensional databases, it would be far from desirable to have to recode all the rules to retrieve data from the different data stores. Implementations of multi-platform calculation rule language avoid this undesirable situation using a combination of preprocessing, variables, and parameters, as described with reference to FIG. 6.

Figure 6:
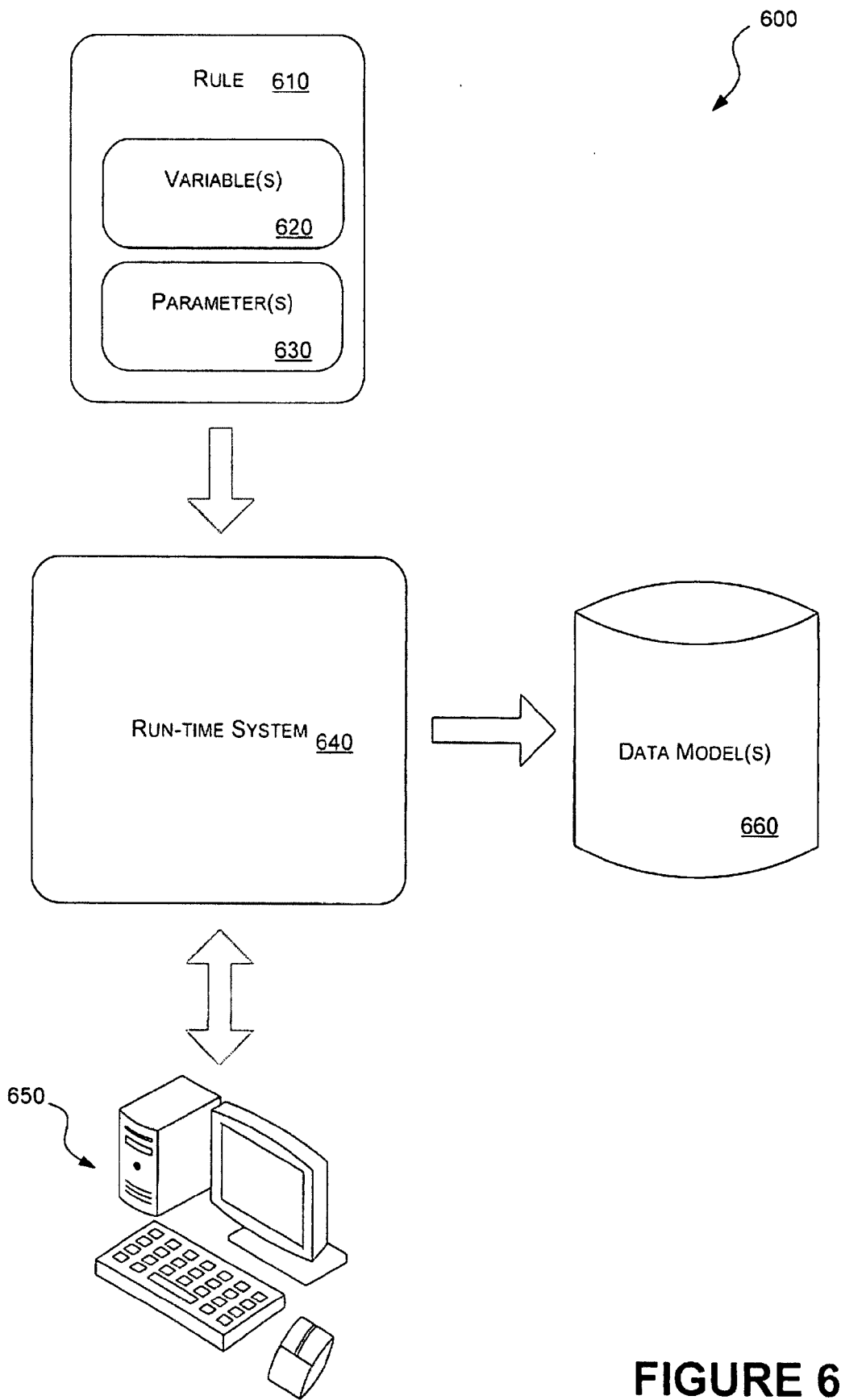
FIG. 6 is a block diagram of components of an implementation of a multi-platform business calculation rule language system.

FIG. 6 illustrates a system 600 allowing one rule 610 to be applied to different one or more different data models according to an implementation of a multi-platform calculation rule language and its environment. In the implementation of the system 600, the rule 610 includes one or more variables 620 and parameters 630. Variables 620 allow the rule to operate on data that includes different members than anticipated in creating the rule 610. As previously described, using a conventional calculation rule language, such as MDX, all the members to be included in the calculation are identified expressly. For example, if the current year is Year 1, and one desires a calculation based on the current year, the MDX query would have to specify the time member of interest is Year 1.

By contrast, by using variables 620, the rule 610 can be defined, for example, in terms of a "&Current_year&" or another suitable variable designation. Then, as the rule 610 is applied when the current year changes, the rule 610 still operates correctly.

Through the use of parameters 630, a user can modify the rule 610 at run time. As further described below, a user of the rule may be prompted to specify one or more parameters included within the rule 610 to adapt the rule 610 for its desired use. For example, if the rule 610 is a budgeting or a forecasting rule in which data for a next time period is based on a multiplier of the current period's values, the user might be prompted at run time to enter the desired multiplier. Again, with some conventional rule languages, the multiplier would have to be programmed into the rule itself or stored in an assumptions table. In either case, the user could not just specify the desired multiplier. However, through the use of parameters 630 in the rule 610, a user can do just that—specify desired values, member selections, or other selections at run time.

The use of variables 620 and parameters 630 in rules created using an implementation of a multi-platform calculation rule language is facilitated by a run-time system 640. In one implementation, the run-time system 640 performs four functions upon being presented with the rule 610. First, the run-time system 640 either automatically identifies which of the data models 660, including one or more relational databases, one or more multi-dimensional databases, or one or more other data models, will be used or prompts the user to select a data model. If there is only one available data model, the run-time system 640 will cause that model to be automatically selected. On the other hand, if multiple models are available, the run-time system 650 will solicit user input, represented by user workstation 650.

Second, once the type of data model is identified, the run-time system 640 resolves the references in the rule 610 to the data model. The run-time system 640 resolves data hierarchies and other attributes of the structure of the model to allow the rule 610 to be applied to different models.

Third, again soliciting user input via the workstation 650, the run-time system 640 will solicit from the user the values to be used for parameters 630 included in the rule 610. As in the foregoing example, if the parameter is a multiplier, the user could be prompted at the workstation 650 to choose what multiplier to have included in applying the rule 610.

Fourth, the run-time system 640 parses data to be used in the rule 610 to allow the processing to be performed according to different paradigms, including declarative, imperative or "rule-driven," and "data-driven" paradigms. Most instruction languages only provide for a single paradigm. For example, SQL and MDX queries are rule-driven or imperative in nature in that, upon execution, specified actions are executed in the order in which they are specified. By contrast, data-driven instructions allow for actions to be performed in response to conditions identified from the data, thus allowing the order in which actions are performed to be responsive to the data. For example, in a data-driven language, rules are applied based on <condition, action> groups specifying mutually exclusive conditions in which the conditions are based on the data. As a result, depending on the data, one of the mutually-exclusive conditions will determine the next action. Thus, while the order in which actions are specified in a rule-driven or imperative language are controlling, the order in which the actions are specified in a data-driven language is not controlling because the conditions will determine the application of the specified actions.

Specifically, and as described further below, implementations of the present disclosure include, for example, "CONSOLIDATION," "CURRENCY," and "RECONCILIATION" rules that are data driven, and apply their actions based on conditions.

To provide an example of the data-driven rules supported by implementations of the present disclosure, an example of a "CONSOLIDATION" rule is provided below:

```
CONSOLIDATION RULE [Elimination for equity for percentage ownership] IS
    SCOPE (METHOD(#Full#),
        ICMETHOD(#Default#),
        [Account].TYPEFILTERINCLUDE("Equity", "BS-net income"));
    SCOPE [Flow].TYPEFILTEREXCLUDE("PY Adj", "FXO",
    "Opening");
        ( ) += POWN * CURRENTTUPLE;
    END SCOPE;
    SCOPE [Flow].TYPEFILTERINCLUDE("PY Adj");
        ( ) += POWN__1 * CURRENTTUPLE;
    END SCOPE;
    END SCOPE;
END RULE;
```

The "CONSOLIDATION" rule example depicts a method of calculating eliminations for equity accounts that will account for the "Percentage of Ownership" for the entity. A computation will be performed for every combination of: (1) an entity that uses the Full method; and (2) an account that is of type "Equity" or "Balance Sheet—Net income" that is populated with data. If the Flow type is not "PY Adj" (Prior Year Adjustment), "FXO" (Foreign Exchange Opening), or "Opening," then the amount shall be incremented by an amount equal to itself multiplied by the Percentage of Ownership of the entity. If the Flow type is "PY Adj," then the amount shall be incremented by an amount equal to itself multiplied by the prior period's Percentage of Ownership of the entity. Thus, as illustrated by this example, implementations of the present disclosure provide that rules can be responsive to the data on which they operate, rather than solely being imperative in nature.

At the same time, implementations of the present disclosure include imperative rules, such as the "ASSIGNMENT" rules described below. Still other rules may be declarative in nature, such as the "DEFINITION" rules described below. Implementations according to the present disclosure support multiple paradigms.

Another aspect of the data-driven nature of the instructions allows for the avoidance of wasteful processing steps. By way of illustration, consider an example that a quota for a current year is to be equal to a result of an average of the attainment of the previous five years, as given by Eq. (1) multiplied by a selected multiplier:

$$\&Current\_Yr\&=Avg(\&Current\_Yr-1\&-\&Current\_Yr-5\&)*Multiplier \quad (1)$$

In the example of Eq. (1), "$$Current_Yr terms are variables to allow the rule to adjust to current, future, or even past years. The Multiplier is a parameter the user can specify at run-time. However, the rule of Eq. (1) may be applied to a model that does not include five years of prior data on which to take an average. In a rule-driven approach, Eq. (1) would be performed as though there were five years of data to be averaged. By contrast, a data-driven approach could respond to data-dependencies and, upon determining there is not five years of data to be averaged, would determine the average of the available data. In one implementation of a business calculation environment, the run-time system 640 can parse the model to avoid performing wasted calculations on null or obviously flawed data. This aspect of the data-driven nature of the instructions is an optimization that avoids unnecessary computation when some or all of the data involved in performing the computations is not available.

Figure 7:
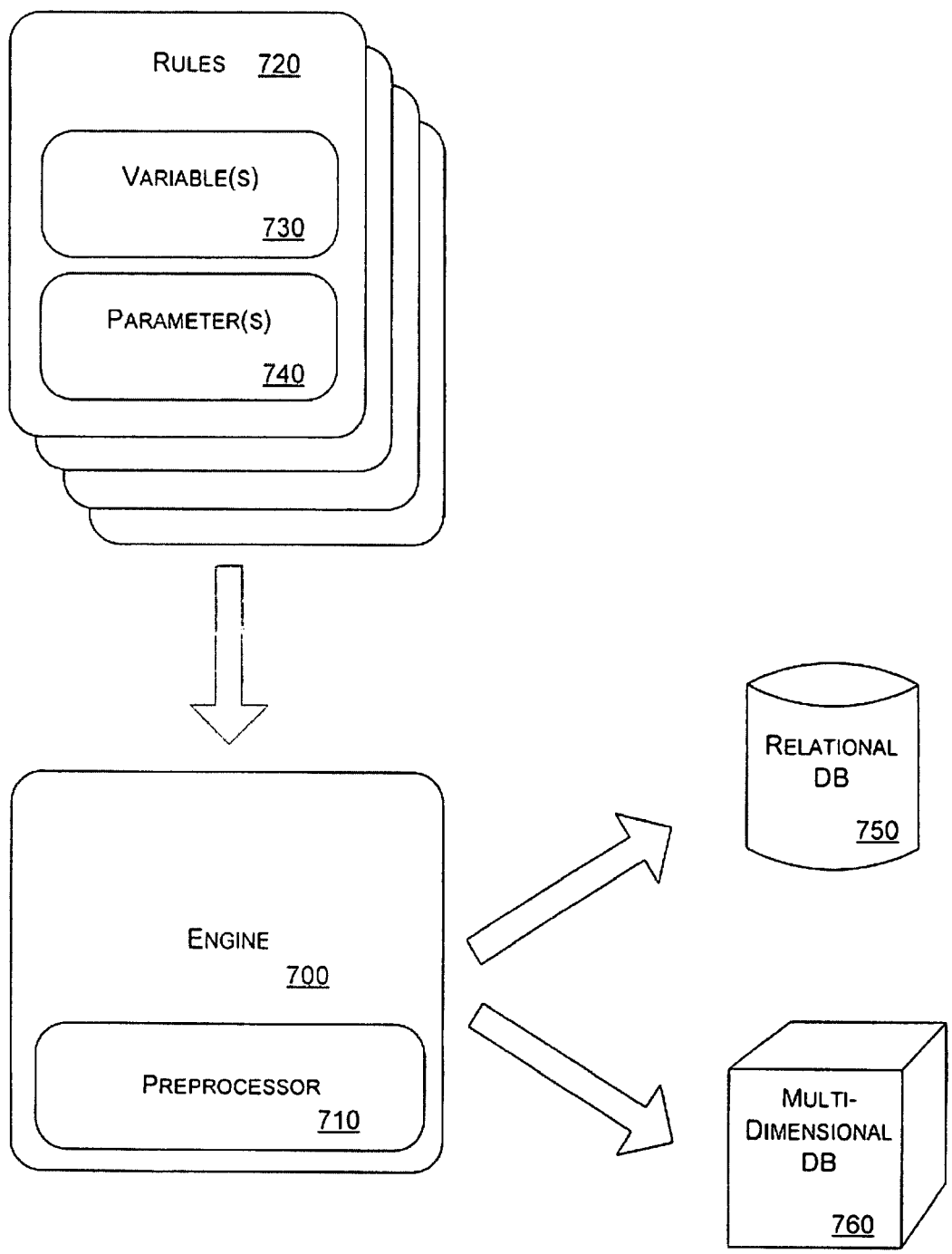
FIG. 7 is a block diagram of a calculation engine employing a plurality of rules created in a multi-platform business calculation rule language.

FIG. 7 shows an extension of implementations of a multi-platform calculation rule language and its environment: the creation of one or more calculation engines. A calculation engine 700 includes a preprocessor 710 (described below) configured to process a plurality of rules 720 to apply the rules 720 on one or more different data models 750 and 760.

The rules 720 may include one or more variables and one or more parameters that allow for a single rule to be applied in many different circumstances as described with reference to FIG. 6. Because the rules 720 may be flexible to adapt to different data structures with different member lists, hierarchies, etc., the engine 700 can be configured to perform a plurality of different computations to automatically undertake even complicated business operations. For example, engines 700 could be created to process intra-company reconciliation, currency exchange calculations, and other processes that may involve a series of calculations or computations.

In order for the engine 700 to be able to adapt the rules 720 to apply to different database models such as data models 750 and 760 having different dimensionalities, hierarchies, or levels, the engine 700 includes a preprocessor 710. For example, the preprocessor 710 allows the rules 720 to function in one way if the data model has an [Flow] dimension and another way if it does not. Based on the dimensionality, hierarchy, and/or level determination(s) made by the preprocessor 710, the preprocessor 710 may effectively eliminate the rule. For example, if a rule 720 addresses dimensionality of a rule that covers aggregating data from multiple years, but the data model 750 only includes a single year, the rule 720 is moot. The preprocessor 710 thus will cause the rule 720 to be ignored or run as a "NoOp."

For another example, consider the case where the operation may include a [Flow] dimension that includes a number of accounts. However, a data model may include only a single account. The preprocessor 710 can adapt the rule to apply to a data model, such as multidimensional data model 760 that may include a plurality of accounts, or, when this dimension does not exist, ignore the dimension. In one implementation, the preprocessor 710 may be implemented in software with the following instructions:

```
SCOPE ([Scenario].[All Members].[Actual],
    #If DimensionExists [Flow] /*This will have the effect of
        specifying the Opening and Salary members if the Account
        dimension exists */
    [Flow].[All Members].[OPENING],
    [Account].[All Members].[Salary]
        #else /* Or some other account if the flow dimension does not
            exist*/
    [Account].[All Members].[Other]
        #end
);
this =1;
end scope;
```

Process of Executing a Calculation Rule Using a Multi-Platform Rule Language

Figure 8:
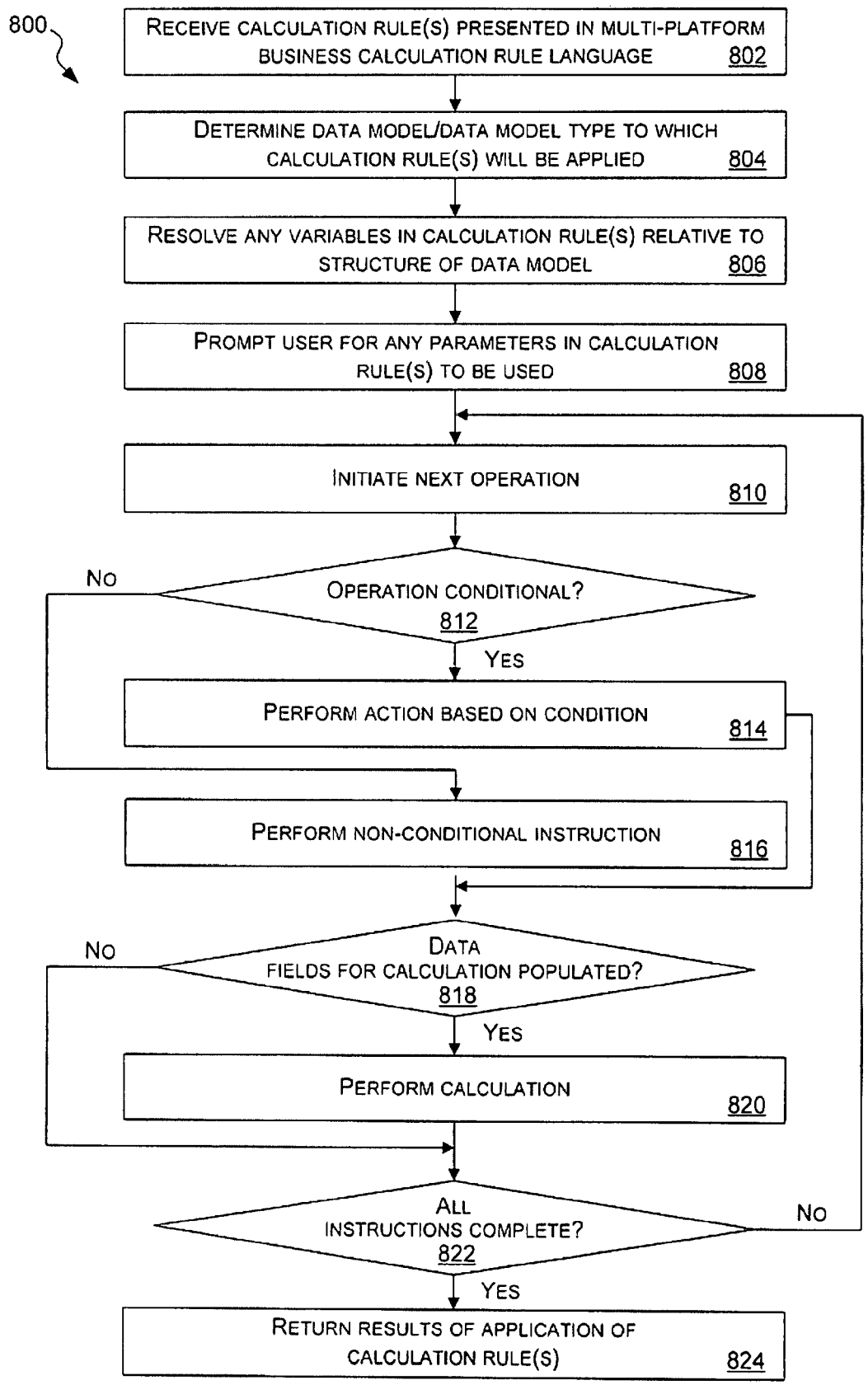
FIG. 8 is a flow diagram of an implementation of the use of a rule created in a multi-platform business calculation rule language.

FIG. 8 presents a flow diagram of an implementation of executing a calculation rule created using a multi-platform business calculation rule language. At 802, one or more calculation rules created using a multi-platform business calculation rule language are received. In one implementation, the calculation rule is received by a run-time system as previously described with reference to FIG. 6. At 804, it is determined what data model and/or data model type to which the calculation rule will be applied. In one implementation, this determination may be made automatically based on the nature of the rule that is received and/or when there is limited choice as to which data model to which the rule may be applied. In another implementation, the determination may be based on user input. At 806, once it is determined at 804 to which type of data model the rule will be applied, variables in the calculation rule are automatically resolved relative to the structure of the data model selected.

It is emphasized that the calculation rule created with an implementation of multi-platform calculation rule language and executed in a suitable environment need not be created or re-created with the line toward the structure of the data model to which it will be applied. An advantage of implementations of the present disclosure is that such a rule can be created without regard to the structure of the data model with which it will be used. Instead, after the fact, at or prior to run time, the structure of the data model is determined specified, and a run-time system adapts calculation rule to operate on the selected data model.

At 808, a user is prompted for any parameters used in the calculation rule. As also previously described, unlike conventional calculation rule languages, not only do implementations of a multi-platform calculation rule language allow for the use of variables, but such implementations also allow for parameters to allow for user input at run time. While some conventional calculation rule languages rely on hard coding of all members and values to be used in calculations, implementations of a multi-platform calculation rule language are far more flexible.

At 810, a next operation specified by the calculation rule is initiated for processing. At 812, as part of this processing, it is determined if the operation is conditional. If so, at 814, the action specified for the specified condition is performed. As previously described, there may be a group of <condition, action pairs> that determines what actions are performed based upon the data. On the other hand, if the instruction is not a conditional instruction, for example, if the instruction is an imperative or declarative instruction, the flow diagram 800 proceeds to 816 for the non-conditional instruction.

At 818, members specified in the calculation rule can be parsed to determine if the data fields for the next calculation are populated for a next member or set of members. If so, at 820, the calculation is performed on those members. After the calculation is performed or if it is determined that the data fields for the next calculation are not populated, at 822, it is determined if all the calculations are complete. If not, the flow diagram 800 loops to 810 to initiate the next operation. On the other hand, if it is determined at 822 that the calculations are complete, at 824, the results of the application of the calculation rules are returned.

Specification of a Multi-Platform Business Calculation Rule Language

By way of illustration of the form that a multi-platform calculation rule language may take, the following is a specification of a sample multi-platform calculation rule language. The following specification describes an exemplary implementation of such a language. Implementations of a multi-platform calculation rule language are by no means limited to the form, syntax, and any other attributes described in the following specification.

Identifiers: Identifiers are used to name functions. Identifiers consist of letters and digits. The underscore character is considered a letter. Identifiers may not begin with a digit. For example: "foo." The "@" character is allowed as a prefix to enable keywords to be used as identifiers. The character @ is not actually part of the identifier.

Parameters: Parameters are used to name local variables. A parameter consists of any characters enclosed by dollar signs. Use two consecutive dollar signs to get one dollar sign into a parameter. For example: "$foo$" or "$foo$$bar$."

References: References are used to name meta-data objects. A reference consists of any characters enclosed by square brackets. Use two consecutive closing square brackets to get one closing square bracket into a reference. For example: "[foo]" or "[a[1]]]." Meta-data objects include dimensions, hierarchies, levels, members, and models. There are two kinds of references: member references and meta-data references.

All references have the following restrictions. Errors will be generated at compile time if the references do not have at least one character, have more than 40 characters, contain no characters other than a space, or have leading or trailing spaces. Warning will be generated if references contain control characters or contain whitespace other than the space character. Metadata references will result in errors if they contain characters in a set including: {., ; ' ' : / \ * | ? "& % $ ! - + = ˆ ( ) [ ]< >}, or if they use reserved names in a set including {AUX, CLOCK$, COM1 through COM9, CON, LPT1 through LPT9, NUL, PRN}.

Strings: Strings are sequences of characters. A string consists of any characters enclosed by double quotes. Use two double quotes to get one double quote into a string. For example: "foo" or "foo""".

Variables: Variables are used to name variables. A variable consists of any characters enclosed by ampersands. Use two consecutive ampersands to get one ampersand into a variable. For example: "&foo&" or "&foo&&bar&".

Verbatim Strings Verbatim strings are used to pass-through MDX or SQL strings. A verbatim string consists of any characters preceded by "<<" and succeeded by ">>". A verbatim string may not contain a ">>". For example "<<foo>>"

Keywords: A keyword is an identifier-like sequence of characters that is reserved, and cannot be used as an identifier except when prefaced by the @ character. The keywords include the words listed in Table (1):

TABLE (1)

AFTER
ALLOCATE
AND
ARGUMENTCOUNT
ARGUMENTDESCENDANTS
AS
ASSIGNMENT
BEFORE
BEFORE_AND_AFTER
BOOLEAN
CONSOLIDATION
CONSOLIDATIONICMETHOD
CONSOLIDATIONMETHOD
CONSOLIDATIONMETHODSPEC
CURRENCY
CURRENTTUPLE
DEFINITION

TABLE (1)-continued

DIMENSION
END
EXCLUDEEMPTY
FALSE
FOR
HIERARCHY
INCLUDEEMPTY
INTEGER
IS
LEAVES
LEVEL
MDX
MEMBER
MEMBERSET
MODEL
NOT
NULL
NUMBER
OF
OR
OUTBOUND
PARAMETER
QUERY
REAL
RECONCILE
RECONCILIATION
RULE
SCOPE
SCRIPT
SELF
SELF_AND_AFTER
SELF_AND_BEFORE
SELF_BEFORE_AFTER
SQL
STRING
THIS
TRANSFER
TRUE
TUPLE
TUPLESET
USEPARTNERENTITY
VALIDATION
VARIABLE
XOR

Literals: A literal is a source code representation of a value, and may include the following literal types: a boolean-literal, and integer-literal, a real-literal, a null-literal, and a this-literal. Boolean literals have two possible values: TRUE and FALSE. Integer literals consist of decimal digits. If an integer-literal is immediately preceded by a sign ("+" or "−"), then that sign will be part of the integer-literal.

A real literal consists of two sequences of decimal digits separated by a period and followed by an exponent specification. Either, but not both, sequences of decimal digits may be omitted. The exponent specification may be omitted. The exponent specification consists of an "E", followed by an optional sign ("+" or "−"), followed by a sequence of decimal digits. For example: "123.", "12.3", "0.123", "12.3E+4", "12.3E4". If the real-literal is immediately preceded by a sign ("+" or "−"), then that sign will be part of the real-literal. Real literals may include the following types listed in Table (2):

TABLE (2)

real-literal:
    real-leading-digits
    real-leading-dots
real-leading-digits:
    decimal-digit decimal-digits exponent-part
    decimal-digit decimal-digits . decimal-digits exponent
real-leading-dots:
    . decimal-digit decimal-digits exponent-part TABLE (2)-continued

```
exponent-part:
    E sign decimal-digits
sign:
    /* empty */
    +
    -
```

A null literal is of a number type, and is indicated by the expression "null". A this literal is of a scope type, and is indicated by a scope type.

Operators: Available operations are listed in Table (3):

TABLE (3)

| , | = | := | == | < > | > | >= | < |
|---|---|----|----|-----|---|----|---|
| <= | + | - | / | * | ^ | : | . |

Punctuators: Available punctuators are listed in Table (4):

TABLE (4)

| ( | ) | { | } | ; |
|---|---|---|---|---|

Semantic Analysis:

Parentheses: there are four steps to determine what an item surrounded by parentheses includes. First, if it contains a single expression of Number type or Boolean type, then the item is that expression and the parentheses are used for precedence. Otherwise, second, if all the expressions are of Member type or Model type, then the item includes a Tuple. Otherwise, third, if all the expressions are of MemberSet type, then the item is a TupleSet. Otherwise, fourth, the item represents an error.

Curly Brackets: there are four steps to determine what an item surrounded by curly brackets includes. First, if there are no expressions, the item is an error. Otherwise, second, if the item contains only expressions of MemberSet type, then the item is a MemberSet. Otherwise, third, if the item contains only expressions of a TupleSet type, then the item is a scope. Otherwise, fourth, the item represents an error.

Types: A data type has two parts: the basic type and attributes. The basic types are listed in Table (5):

TABLE (5)

```
ArgumentCount
ArgumentDescendants
Boolean
ConsolidationICMethod
ConsolidationMethodSpec
ConsolidationMethod
ConsolidationUsePartnerEntity
Dimension
Hierarchy
Level
MemberSet
    Member
Model
Number
    Integer
    Real
Scope
String
TupleSet
    Tuple
```

A given basic type is an instance of any of its parent basic types. For example, an object of basic type Integer is also of the Number basic type.

The attributes include Dimension, Hierarchy, and Level. Each attribute may evaluate to a literal or be indeterminate. An attribute represents a constraint on a data type in addition to its basic type. Level is the most constraining, next is Hierarchy, and last is Dimension. If a basic type is constrained to a particular Level then it will also be constrained to a particular Hierarchy and Dimension. If a basic type is constrained to a particular Hierarchy then it will also be constrained to a particular Dimension. Except as noted below, all attributes will be INDETERMINATE. A Hierarchy may have a literal Dimension. A Level may have a literal Hierarchy. A MemberSet may have a literal Level.

For example, the following four data types are arranged from least constrained to most constrained: (1) MEMBER; (2) MEMBER OF DIMENSION [Time], (3) MEMBER OF HIERARCHY [Time].[Calendar]; and (4) MEMBER OF LEVEL [Time].[Calendar].[Months]. The [Time].[Calendar].[Months].[January 2006] member has the following attributes: (1) DIMENSION is [Time]; (2) HIERARCHY is [Time].[Calendar]; and (3) LEVEL is [Time].[Calendar].[Months]. For example, the expression "2÷2" has the following attributes: DIMENSION is INDETERMINATE; HIERARCHY is INDETERMINATE; and LEVEL is INDETERMINATE.

Operators require that their operands have particular types or consistency between their types. For example: a MEMBER OF DIMENSION [Time] may be assigned to a MEMBER but a MEMBER may not be assigned to a MEMBER OF DIMENSION [Time]. Similarly, a MEMBER OF DIMENSION [Account] may not be assigned to a MEMBER OF DIMENSION [Time].

Scope Contexts: There are three scope contexts: Destination Scope context; Scope context, and Standard Scope context. Scope context occurs in the scope clause of a scope statement. Destination scope context occurs on the left-hand side of an assignment. Standard scope context is anywhere other than Scope context or Destination scope context.

Push rules versus Pull rules: Consolidation and Currency rules use "push" rule semantics. All other rule types use "pull" rule semantics. For example, consider this rule fragment:

```
SCOPE (scope);
    destination += source;
END SCOPE;
```

In a "pull" rule, the scope and destination specifications are combined to determine the effective destination of the rule—the cells that will be changed. The source is specified relative to the effective destination. The rule goes to each destination cell to be changed and "pulls" the operands it needs from the source to perform the computation.

On the other hand, in a "push" rule, the source is specified relative to the scope. The destination is specified relative to the source. The rule goes to each source cell, performs the computation, and the "pushes" the result to the destination cell.

Relative Context: A scope context is either Relative or Absolute. Only in a relative context can a member be specified relative to another member. The CurrentMember function is used to make a relative specification and may only be used in Relative Context. For example, consider the following example:

```
SCOPE (scope);
    destination = source;
END SCOPE;
```

In a pull rule, the source is a relative context since it may be specified relative to the destination and/or scope. In a push rule, both the source and destination are relative contexts since the source is specified relative to the scope and the destination is relative to the source. For example, consider the following example:

```
SCOPE (scope);
    expression;
END SCOPE;
```

In this example, expression is in a relative context since it is specified relative to scope.

Conversions: Table (6) illustrates implicit conversions that are performed:

TABLE (6)

| Type From | Type To | Notes |
|---|---|---|
| TupleSet | Scope | {TupleSet} |
| MemberSet | TupleSet | (MemberSet) |
| Tuple | TupleSet | upcast |
| Integer | Number | upcast |
| Real | Number | upcast |
| Tuple | Number | dereference |
| Model | Tuple | (Model) |
| ConsolidationMethod | Tuple | (ConsolidationMethod) |
| ConsolidationICMethod | Tuple | (ConsolidationICMethod) |
| ConsolidationUsePartnerEntity | Tuple | (ConsolidationUsePartnerEntity) |
| Member | Tuple | (Member) |
| Hierarchy | MemberSet | hierarchy.Members |
| Level | MemberSet | level.Members |
| Member | MemberSet | upcast |

Any type can be "upcast" within the hierarchy of Table (6). For example, an Integer can be used wherever a Number is required. A Tuple Nay be de-referenced to obtain a Number wherever a Number is required except in a Tuple specification. A Hierarchy or Level can be used where a MemberSet is required. The "Members( )" function will be applied to get a MemberSet.

In the remaining cases, the implicit type conversions save you the effort of adding parentheses or curly brackets. The type conversions are applied transitively. Thus, a MemberSet can be converted to a Scope. The conversions will be from MemberSet to TupleSet and from TupleSet to Scope. In the event there are two ways to convert from one type to another, the first conversion listed in the table takes precedence. For example, Member will be converted to TupleSet via Tuple not MemberSet because the Member to Tuple conversion takes precedence over the Member to MemberSet conversion.

Expressions: when evaluated, all expressions have a type. Type checking ensures that the types of operand expressions are consistent with what an operator requires.

Operators:

Operator precedence and associativity: Table (7) summarizes all operators in order of precedence from highest to lowest:

TABLE (7)

| Category | Operators |
|---|---|
| Primary | x.y (x) f(x) x.f(y) |
| Unary | + − NOT |
| Range | : |
| Power | ^ |
| Multiplicative | * / |
| Additive | + − |
| Relational | < > <= >= |
| Equality | == <> |
| Conditional AND | AND |
| Conditional XOR | XOR |
| Conditional OR | OR |
| Assignment | = := += −= *= /= ^= |

Push rules versus Pull rules: Consolidation and Currency rules use "push" rule semantics. All other rule types use "pull" rule semantics. For example, consider this rule fragment: The Assignment and Power operators are right-associative. All binary operators, except the Assignment and Power operators, are left-associative. For example, A*B*C is equivalent to (A*B)*C because multiplication if left-associative. A^B^C is equivalent to A^ (B^C) because exponentiation is right-associative.

Primary Expressions:

Literals: Booleans are TRUE or FALSE. Integer literals must be within the valid Int32 range. Real literals must be from the valid double range; they may not be infinity or NaN. A string can include any sequence of characters.

Arguments: Special keywords used as argument to functions. For example, the EXCLUDEEMPTY keyword may be used as an argument to the COUNT function. Simple Names: simple names include identifiers, references, variables, and modelreferences. A model reference includes the keyword MODEL followed by a reference enclosed in parentheses, e.g., "MODEL(reference)." Although the model reference appears to be a function call, the parentheses enclose a reference, not a name-list.

NameLists: A NameList is a sequence of references separated by dots. The list must have at least one reference. For example:

```
name-list:
    reference
    name-list . reference
```

Parenthesized Expressions: Parenthesized expressions may include a set or a tuple, such as {expression-list} or (expression-list), respectively.

Invocation Expressions: There are several types of invocative expressions. A non-unction dotted function call is composed of an identifier followed by an expression-list in parentheses. The parentheses may be omitted if the expression list is empty. For example:

```
non-dotted-function-call:
    identifier ( expression-list )
    identifier
```

An expression-list is a sequence of expressions separated by commas. The list may have zero expressions. For example:

```
expression-list:
    /* empty */
    expression
    expression-list, expression
```

A dotted function call is composed of an expression followed by a dot, then an identifier, followed by an expression-list in parentheses. The parentheses may be omitted if the expression-list is empty. For example:

```
dotted-function-call:
    expression . identifier ( expression-list )
    expression . identifier
    name-list . identifier ( expression-list )
    name-list . identifier
```

The dotted function call syntax is a shorthand for a non dotted function call: the dotted expressions is made the first expression in the expression list. For example:

```
    e1.identifier(e2, e3, ..., eN)
is equivalent to
    identifier(e1, e2, e3, ..., eN).
```

Unary Operators: Unary operators include arithmetic unary operators and logical unary operators. An arithmetic unary operation includes a Number type operand. If the operand is of Integer type, then the result is integer type. If the operand is of Real type, then the result is Real type. Otherwise, the result is Number type. An arithmetic unary operator is indicated with an arithmetic symbol followed by an expression, e.g., "+expression" or "−expression".

Logical unary operators must have a Boolean type operand. The result is a Boolean type. A logical unary operator is indicated with a logical symbol followed by an expression, e.g., "NOT expression".

Range Expressions: Range expression operators must have Member type operands. The result is a MemberSet type. For example:

```
expression:
    expression :
    expression : expression
    : expression
```

Arithmetic Operators: Each of these operators must have Number type operands, and the result is a number type: power operator (e.g., expression ^ expression), multiplicative operators (e.g., expression*expression, expression/expression), and additive operators (e.g., expression+expression, expression−expression).

Relational Operators: Relational operators must have Number type operands. The result is a Boolean type. Relational operators include, for example:

```
expression < expression
expression > expression
expression <= expression
expression >= expression
```

Equality Operators: Equality operators must have Boolean, Number, or String type operands. The operands must both be of the same type. The result is a Boolean type. For example:

```
expression == expression
expression < > expression
```

Logical Operators: Logical operators must have Boolean type operands. The result is a Boolean type. For example, logical operators may include:

```
expression AND expression
expression OR expression
expression XOR expression
```

Assignment Operators: There are two kinds of assignment operators: assignments to cells in the model, and assignments to variables. For assignments to cells in the model, the left operand must be of Scope type and the right operand must be of Number type. The result is second type. For assignments to variables, the right operand must be consistent with the type of the left operand. The result is the type of the right operand. For example:

```
expression := expression
expression = expression
expression += expression
expression −= expression
expression *= expression
expression /= expression
expression ^= expression
```

The compound assignment operators (+=−=*=/=^=) are semantically equivalent to a combination of their corresponding binary operator and a simple assignment. For example, "expression1*=expression2" is equivalent to "expression1=CURRENTUPLE*expression2".

Variables: Variable references refer to global variables. Parameters refer to local variables. Effectively, a parameter is a variable except that it is anonymous (has no name) outside a rule. Variables may not be referenced in Definition rules.

Variable Constraint: A variable constraint specifies the restriction on the data type of a variable. An as-variable constraint is indicated by the expression "AS variable-constraint." The variable constraints are listed in Table (8):

TABLE (8)

ARGUMENTCOUNT
ARGUMENTDESCENDANTS
BOOLEAN
CONSOLIDATIONICMETHOD
CONSOLIDATIONMETHOD
CONSOLIDATIONMETHODSPEC
HIERARCHY OF DIMENSION expression
INTEGER
LEVEL OF HIERARCHY expression
MEMBER OF DIMENSION expression
MEMBER OF HIERARCHY expression
MEMBER OF LEVEL expression
MEMBERSET OF DIMENSION expression
MEMBERSET OF HIERARCHY expression
MEMBERSET OF LEVEL expression
NUMBER
REAL
SCOPE
STRING
TUPLE
TUPLESET Parameters:

Parameter Declarations: A parameter declaration list is a list of parameter declarations separated by commas. Parameters may not be declared in Definition rules. The list may be empty. For example:

```
parameter-declaration-list:
    /* empty */
    parameter-declaration
    parameter-declaration-list, parameter-declaration
parameter-declaration:
    parameter as-variable-constraint
```

Parameters may not be declared in Definition rules.

Implicit Parameter Declarations: The following declaration is implicitly included y user-created parameter declarations if the corresponding dimension exists:

$CURRENTPERIOD$ AS MEMBER OF DIMENSION [Time]

Declaring it explicitly will result in an error message for a redundant declaration.

Parameter References: A parameter may be referenced in any expression. However, parameters may not be referenced in Definition rules.

Units: There are four kinds of units: rules, variable declarations, variable definitions, and parameter declarations. The units may be indicated as follows:

```
rule-unit
variable-declaration-unit
variable-definition-unit
parameter-declaration-unit
```

Rule: A rule applies or evaluates its statement list. The parentheses surrounding the parameter declaration list may be omitted if the list is empty. For example:

```
ruletype RULE reference IS statement-list END RULE
ruletype RULE reference ( parameter-definition-list )
    IS statement-list END RULE
```

Rule Types: There are nine types of rules, as listed in Table (9):

TABLE (9)

ASSIGNMENT
CONSOLIDATION
CURRENCY
DEFINITION
OUTBOUND
QUERY
RECONCILIATION
VALIDATION
VARIABLE

Variable Declaration: A variable declaration declares a variable and gives it an initial value, for example:

```
variable-declaration-unit:
    VARIABLE variable as-variable-constraint IS expression;
```

Variable Definition: A variable definition gives a variable a new value and must be a procedural assignment. For example:

```
variable-definition-unit:
    VARIABLE expression;
```

Parameter Definition: A parameter definition gives an initial value to a parameter. For example:

```
parameter-definition-unit:
    PARAMETER as-variable-constraint IS expression;
```

Statements: There are nine kinds of statements, as listed in Table (10):

TABLE (10)

allocate-statement
empty-statement
expression-statement
mdx-query-statement
mdx-script-statement
reconcile-statement
scope-statement
sql-statement
transfer-statement All statements, except for the FOR version of the scope statement, end with a semi-colon. Items that have a statement list have an END. For example, RULE has END RULE, and SCOPE has END SCOPE. Statements that do not have a statement list, end with a semi-colon. Semi-colons are statement terminators, not statement separators, except in the scope statement when a semi-colon can appear after the scope expression.

Statement Lists: Statement lists consist of zero or more statements. A warning will be issued if a statement list has zero statements. It is an error for a statement list to have more than one statement except in Consolidation or Currency rules. For example:

```
statement-list:
    /* empty */
    statement-list statement
```

Empty Statement: The empty statement, e.g., "empty-statement:" is a null statement, and does nothing.

Expression Statement: An expression-statement evaluates a given expression. For example:

```
expression-statement:
    expression;
```

Function Statements: Function statements look similar to non-dotted function invocations. For example:

```
statement-argument-list:
    /* empty */
    ( expression-list )
```

Allocation Statements: Allocation statements may include up to six arguments:

Target—Specifies the set of cells to receive the allocation. Must be of type Scope.

Source—Specifies the source of an allocation relative to the Target. Must be of type Number.

Ratio—Specifies a scaling factor to be applied to the Source. Must be of type Number.

Cross-Model Mapping Source—Specifies the members from the source model. Must be of type Scope. Required only for cross-model allocation.

Cross-Model Mapping Target—Specifies the members in the target model that correspond to the source model. Must be of type Scope. Required only for cross-model allocation.

Specifies the Source model. Must be of type Model. Required only for cross-model allocation.

There is not necessarily an obvious correspondence between the dimensions and members in two different models. Therefore, in a Cross-Model Allocation the correspondence must be specified. The correspondence is established by the two Cross-Model Mapping parameters.

Single-Model Allocation Example:

Problem: Allocate to each month in 2006, 1/12th of the Revenue from the previous year.

Solution: ALLOCATE (([Time].[Calendar].[Year2006].Leafs, [Account].[Account].[Revenue]), [Time].[Calendar].Parent.Parent.Lag(1), 1/12);

Explanation: The Target, ([Time].[Calendar].[Year2006].Leafs, [Account].[Account].[Revenue]), specifies the months of 2006 in the Revenue account. (Assume that the levels of the Time dimension are Year, Quarter, and Month.) The Source, [Time].[Calendar].Parent.Parent.Lag(1), specifies that for each target cell the calculation should go up two levels (to Year 2006) and then backwards one member (to Year 2005). The Ratio, specifies each target cell is allocated 1/12 of the value in the source cell.

Cross-Model Allocation Example: In the source model, there are members [Red shirt], [White shirt], and [Blue shirt] in the [Product].[Product] hierarchy. However, in the target model, we have members [Shirt, Red], [Shirt, White], and [Shirt, Blue] in the [Product].[Product] hierarchy. For the Cross-Model Mapping Source parameter the following is entered: ([Product].[Product].[Red shirt], [Product].[Product].[White shirt], [Product].[Product].[Blue shirt]). For the Cross-Model Mapping Target parameter, the following would be entered: we would enter: ([Product].[Product].[Shirt, Red], [Product].[Product].[Shirt, White], [Product].[Product].[Shirt, Blue]). This specifies that the member [Product].[Product].[Red shirt] in the source model corresponds to the member [Product].[Product].[Shirt, Red] in the target model because they have the same respective (1st) position in both parameters. Similarly, a correspondence is established between the 2nd members in each parameter.

Allocate Statement: An Allocate statement alters its destination but does not alter its source. It sets the destination as a function of the source. For example:

```
allocate-statement:
    ALLOCATE statement-argument-list;
```

Transfer Statement: A Transfer statement alters its destination and alters its source. In effect it moves values from the source to the destination. For example:

```
transfer-statement:
    TRANSFER statement-argument-list;
```

Reconcile Statement

A Reconcile statement performs inter-company reconciliations. For example:

```
reconcile-statement:
    RECONCILE statement-argument-list;
```

Pass-Through Statements: Pass-through statements cause their verbatimString to be generated as MDX or SQL.

MDX Query Statement: An MDX query statement generates the verbatimString as a MDX query. For example:

```
mdx-query-statement:
    MDX QUERY verbatimString;
```

MDX Script Statement: An MDX script statement generates the verbatimString as MDX script. For example:

```
mdx-script-statement:
    MDX SCRIPT verbatimString;
```

SQL Statement: An SQL statement generates the verbatimString as an SQL statement. For example:

```
sql-statement:
    SQL verbatimString;
```

Scope Statement: A scope statement evaluates its statement-list while applying its expression as a scope. It is an error for a Scope Statement to appear anywhere other than in the statement list for a Rule except in Consolidation or Currency rules. The expression must be of Scope type. For example:

```
scope-statement:
    SCOPE expression; statement-list END SCOPE;
    SCOPE expression FOR statement-list END SCOPE
```

Implementation:
Engines: There are seven engines that can execute rules:
Consolidation engine;
General engine;
Mdx Query engine;
Mdx Script engine;
Outbound engine;
Reconciliation engine; and
SQL engine.

A specific implementation is required by the following constructs:
A Consolidation or Currency rule-type requires a Consolidation implementation.
Use of a Consolidation function requires a Consolidation implementation.
An Outbound rule-type requires an Outbound implementation.
An MdxQueryStatement requires an MdxQuery implementation.
An MdxScriptStatement requires an MdxScript implementation.
A SqlStatement requires a Sql implementation.
Reconciliation rules can only be implemented by the Reconciliation engine.
Reconcile statements must be implemented by the Reconciliation engine.
A Variable rule can only be implemented by the General engine.
A variable assignment can only be implemented by the General engine.

A specific implementation is forbidden by the following constructs:
A rule-type other than Consolidation or Currency forbids a Consolidation implementation.
A rule-type other than Outbound forbids an Outbound implementation.
An Assignment, Query, or Validation rule-type forbids an MdxScript implementation.
Referencing a parameter forbids a Sql implementation.
Use of a function not supported by Sql forbids a Sql implementation.
Rules other than Reconciliation rules cannot be implemented by the Reconciliation engine.
Rules other than Variable rules cannot be implemented by the General engine.
It is an error if the constructs in use forbid all of the possible implementations.

Functions:
Regular Functions:
General functions are listed in Table (11):

TABLE (11)

| Name | ReturnType | Arguments |
|---|---|---|
| Count | Integer | Scope [, ArgumentCount] |
| CrossJoin | Scope | Scope, Scope |
| Filter | Scope | Scope, Boolean |
| Generate | MemberSet | MemberSet, MemberSet |
| Hierarchy | Hierarchy | Level |
| Hierarchy | Hierarchy | Member |
| Iif | Number | Boolean, Number, Number |
| Iif | String | Boolean, String, String |
| IsLeaf | Boolean | Member |
| LastPeriods | MemberSet | Integer [, Member] |
| Level | Level | Member |
| Members | MemberSet | Hierarchy |
| Members | MemberSet | Level |
| Ordinal | Integer | Level |
| ParallelPeriod | Member | [Level [, Integer [, Member]]] |
| PeriodsToDate | MemberSet | [Level [, Member]] |
| Properties | String | Member, String |

In Table (11), ArgumentCount must include one of the following:

EXCLUDEEMPTY
INCLUDEEMPTY

Relative functions are listed in Table (12):

TABLE (12)

| Name | ReturnType | Arguments |
|---|---|---|
| CurrentMember | Member | Hierarchy |
| Ignore | Member | Dimension |

Member to Member Mapping functions, which are described in detail below, are listed in Table (13):

TABLE (13)

| Name | ReturnType | Arguments |
|---|---|---|
| Ancestor | Member | Member, Integer |
| Ancestor | Member | Member, Level |
| Cousin | Member | Member, Member |
| FirstChild | Member | Member |
| FirstSibling | Member | Member |
| Lag | Member | Member, Integer |
| LastChild | Member | Member |
| LastSibling | Member | Member |
| Lead | Member | Member, Integer |
| NextMember | Member | Member |
| Parent | Member | Member |
| PrevMember | Member | Member | member.Ancestor(distance) Returns: Member.

member.Ancestor(level): This function returns the member's ancestor at the target distance or level. If a distance number is specified, it is the number of hierarchical levels above the member. A distance of 0 will return member. If a level is specified and it is the level of member, then member is returned.

member.Cousin(uncle-member) Returns: Member. Let ancestor-member be the member that is an ancestor of member and at the same level as uncle-member. This function returns the member that has the same relative position under uncle-member as member has under ancestor-member. For example, let ancestor-member.FirstChild.Lead(i).FirstChild.

Lead(j).FirstChild.Lead(k) be member. The function will member.FirstChild.Lead(i).FirstChild.Lead(j).FirstChild.Lead(k).

member.FirstChild Returns: Member. Specifically, this function returns the first child of the member, if it has children.

member.FirstSibling Returns: Member. Defined as: member.Parent.FirstChild This function returns the first child of its parent. The first child of a parent is its own first sibling.

member.Lag(index) Returns: Member. This function gives the member that is index number of members before member along the same level.member.Lag(0) results in member. A negative index specifies the number of members after member. Note that the member returned is regardless of whether the new member shares the same parent with member.

member.LastChild Returns: Member. This function returns the last child of member, if it has children.

member.LastSibling Returns: Member. Defined as: member.Parent.LastChild. This function returns the last child of its parent. The last child of a parent is its own last sibling.

member.Lead(index) Returns: Member. Defined as: member.Lag(-index). This function gives the member that is index number of members after member along the same level.

member.NextMember Returns: Member. Defined as: member.Lead(1). This function gives the next member along the level implied by the member.

member.Parent Returns: Member. Defined as: member.Ancestor(1). This function returns the parent of member, if it has one.

member.PrevMember Returns: Member. Defined as: member.Lag(1). This function gives the previous member along the level implied by the member.

Member to MemberSet Mapping: Member to MemberSet Mapping functions are described in detail below, and are listed in Table (14):

TABLE (14)

| Name | ReturnType | Arguments |
| --- | --- | --- |
| Ascendants | MemberSet | Member |
| Children | MemberSet | Member |
| Descendants | MemberSet | Member [, Level [, ArgumentDescendants]] |
| Descendants | MemberSet | Member, Integer [, ArgumentDescendants]] |
| Leafs | MemberSet | Member |
| Range | MemberSet | Member, Integer, Integer |
| Siblings | MemberSet | Member | member.Ascendants Returns: MemberSet. This function returns the full set of ancestors for the specified member all the way up to the root of the hierarchy. The specified member is in the MemberSet.

member.Children Returns: MemberSet. Defined as: member.Descendants(1). This function returns the children of the specified member. If applied to a leaf member, the returned MemberSet is empty.

member.Descendants([level [, argument-descendants]]) Returns: MemberSet.

member.Descendants(distance [, arguments-descendants]). This function returns a set of descendants from the specified member using the given level, or numeric distance from the specified member's level, as a reference point. Arguments-descendants must be one of the following:

```
AFTER
BEFORE
BEFORE_AND_AFTER
LEAVES
SELF
SELF_AND_AFTER
SELF_AND_BEFORE
SELF_BEFORE_AFTER
``` member.Descendants is defined as member.Descendants(0, SELF_AND_AFTER)

member.Descendants(level) is defined as member.Descendants(level, SELF)

member.Descendants(distance) is defined as member.Descendants(distance, SELF)

member.Leafs Returns: MemberSet. Defined as: one of (1) member.Descendants(infinity, LEAVES) in a parent-child hierarchy; and (2) member.Descendants(level, SELF) in a level hierarchy where level is the deepest level in the hierarchy. This function returns the leaf members at or below the specified member.

member.Range(begin, end) Returns: MemberSet. Defined as: member.Lag(begin):member.Lead(end). This function provides a convenient way to specify an inclusive range from begin to end relative to the specified member.

member.Siblings Returns: MemberSet. Defined as: member.Parent.Children. This function returns the set of siblings of the specified member. The resulting MemberSet includes the specified member.

Member Predicates: Member Predicates are listed in Table (15):

TABLE (15)

| Name | ReturnType | Arguments |
| --- | --- | --- |
| IsAncestor | Boolean | Member, Member |
| IsSibling | Boolean | Member, Member |

Periods: Periods are listed in Table (16):

TABLE (16)

| Name | ReturnType | Arguments |
| --- | --- | --- |
| ClosingPeriod | Member | [Level [, Member]] |
| OpeningPeriod | Member | [Level [, Member]] |

Periods to Date: Periods to Date are listed in Table (17):

TABLE (17)

| Name | ReturnType | Arguments |
| --- | --- | --- |
| MTD | MemberSet | [Member] |
| QTD | MemberSet | [Member] |
| WTD | MemberSet | [Member] |
| YTD | MemberSet | [Member] |

MemberSets: MemberSets are listed in Table (18):

TABLE (18)

| Name | ReturnType | Arguments |
| --- | --- | --- |
| Except | MemberSet | MemberSet, MemberSet |
| Intersection | MemberSet | MemberSet, MemberSet |
| Union | MemberSet | MemberSet, MemberSet |

Bottom & Top: Bottom & Top statements are listed in Table (19):

TABLE (19)

| Name | ReturnType | Arguments |
|---|---|---|
| Bottom | Scope | Scope, Integer [, Number] |
| BottomPercentage | Scope | Scope, Integer [, Number] |
| BottomSum | Scope | Scope, Integer [, Number] |
| Top | Scope | Scope, Integer [, Number] |
| TopPercentage | Scope | Scope, Integer [, Number] |
| TopSum | Scope | Scope, Integer [, Number] |

Statistics—Advanced: Statistics-Advanced statements are listed in Table (20):

TABLE (20)

| Name | ReturnType | Arguments |
|---|---|---|
| Correlation | Number | Scope, Number [, Number] |
| Covariance | Number | Scope, Number [, Number] |
| CovarianceN | Number | Scope, Number [, Number] |
| LinRegIntercept | Number | Scope, Number [, Number] |
| LinRegPoint | Number | Scope, Number [, Number] |
| LinRegR2 | Number | Scope, Number [, Number] |
| LinRegSlope | Number | Scope, Number [, Number] |
| LinRegVariance | Number | Scope, Number [, Number] |

Statistics—Basic: Statistics-Basic statements are listed in Table (21):

TABLE (21)

| Name | ReturnType | Arguments |
|---|---|---|
| Avg | Number | Scope [, Number] |
| Max | Number | Scope [, Number] |
| Median | Number | Scope [, Number] |
| Min | Number | Scope [, Number] |
| StdDev | Number | Scope [, Number] |
| StdDevP | Number | Scope [, Number] |
| Sum | Number | Scope [, Number] |
| Variance | Number | Scope [, Number] |
| VarianceP | Number | Scope [, Number] |

Filters: Filters are listed in Table (22):

TABLE (22)

| Name | ReturnType | Arguments |
|---|---|---|
| ClassificationFilterExclude | MemberSet | Dimension, String [, up to 30 String total] |
| ClassificationFilterInclude | MemberSet | Dimension, String [, up to 30 String total] |
| TypeFilterExclude | MemberSet | Dimension, String [, up to 30 String total] |
| TypeFilterInclude | MemberSet | Dimension, String [, up to 30 String total] |

Consolidation Scoping: Consolidation scoping statements are listed in Table (23):

TABLE (23)

| Name | ReturnType | Arguments |
|---|---|---|
| ICMethod | ConsolidationICMethod | ConsolidationMethodSpec [, ConsolidationMethodSpec [, ConsolidationMethodSpec [, ConsolidationMethodSpec [, ConsolidationMethodSpec |

TABLE (23)-continued

| Name | ReturnType | Arguments |
|---|---|---|
| Method | ConsolidationMethod | ConsolidationMethodSpec [, ConsolidationMethodSpec [, ConsolidationMethodSpec [, ConsolidationMethodSpec [, ConsolidationMethodSpec |

Consolidation Functions: Consolidation functions are listed in Table (24)

TABLE (24)

| Base Function | Remainder | | | VAR form |
|---|---|---|---|---|
| PCON | PCON_1 | IPCON | IPCON_1 | VAR_PCON |
| PMIN | PMIN_1 | IPMIN | IPMIN_1 | VAR_PMIN |
| POWN | POWN_1 | IPOWN | IPOWN_1 | VAR_POWN |

Other remaining consolidation functions include:

MIN_PCON_IPCON
MIN_PCON_1_IPCON_1
VAR_MIN_PCON_IPCON_MIN_PCON_1_IPCON_1
AVE
CLOAVE
PRIORAVE
CLOAVEPRIOR
OPE
VAROPE
HIST
CLO
PRIORCLO

SQL Supported Functions: The support for functions in Sql can be divided into three categories. Fully Supported functions can always be generated in Sql. Absolute Supported functions can be generated in Sql if they are not part of a relative reference. Never Supported—these can never be generated in Sql. For example, an absolute reference would include "[Time].[Fiscal].[January 2006].Lag(1).aFunction", while a relative reference would include "[Time].[Fiscal].CurrentMember.Lag(1).aFunction".

EXAMPLES

Sample Assignment Rule

ASSIGNMENT RULE [Copy previous period forward] IS
    SCOPE $CURRENTPERIOD$;
        THIS = $CURRENTPERIOD$.LAG(1);
    END SCOPE;
END RULE Sample Validation Rule:

VALIDATION RULE [Headcount] IS
    [Account].[Account].[Headcount] >= 0;
END RULE Sample Consolidation Rule:

```
CONSOLIDATION RULE [Inter-company elimination for equity] IS
    SCOPE (METHOD(#Full#),
        ICMETHOD(#Default#),
        [Account].TypeFilterInclude("Equity", "BS-net income"));
    SCOPE [Flow].TypeFilterInclude("PY Adj");
        ()      -= PCON__1 * CURRENTTUPLE; // E3 && E7
        ()      += PMIN__1 * CURRENTTUPLE; // E4 && E8
        ()      += POWN__1 * CURRENTTUPLE; // E10 && E12
    END SCOPE;
    SCOPE [Flow].TypeFilterExclude("PY Adj", "FXO", "Opening");
        ()      -= PCON * CURRENTTUPLE; // E1 && E5
        ()      += PMIN * CURRENTTUPLE; // E2 && E6
        ()      += POWN * CURRENTTUPLE; // E9 && E11
        END SCOPE;
    END SCOPE;
END RULE
```

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium storing instructions executable by a computing system to perform a plurality of functions, comprising:
receiving a calculation rule presented in a multi-platform expression language to be applied to a data model selected from different data models having different structures, the calculation rule being received by one or more of:
retrieving the calculation rule from a store of previously-created calculation rules; and
accepting user entry of the calculation rule;
processing the calculation rule for application to the data model, including:
responding to whether the calculation rule is data-driven, including:
when the calculation rule is data-driven, determining a condition specified by the calculation rule and performing an action specified by the calculation rule based on the condition; and
when the calculation rule is not data-driven, performing the action specified by the calculation rule;
identifying a database platform supporting the data model; wherein the database platform is selected from a group of platforms comprising: a structured query language (SQL) platform that accesses a SQL database in which dimensions and data models are represented as a plurality of tables and a multi-dimensional database platform that accesses a multi-dimensional database in which the dimensions and the data models are stored in a multi-dimensional structure;
preprocessing the calculation rule to adjust the calculation rule to operate based on a dimensionality of the data model; wherein preprocessing the calculation rule comprises determining when the calculation rule accesses more information than the data model provides and determining when to eliminate the calculation rule based on this determination;
upon identifying one or more variables included in the calculation rule, resolving the variables in terms of the data model; and
upon identifying one or more parameters included in the calculation rule, soliciting input for the parameters for use in applying the calculation rule to the data model by displaying a prompt to receive the parameters; and
executing the calculation rule.

2. The computer-readable storage medium of claim 1, wherein the identifying of the selected platform comprises receiving a user input identifying the selected platform.

3. The computer-readable storage medium of claim 2, wherein the identifying of the selected platform comprises automatically identifying the selected platform.

4. The computer-readable storage medium of claim 2, further comprising evaluating data maintained in the data model to determine whether the data model maintains data referenced in a function specified in the calculation rule before executing the function.

5. The computer-readable storage medium of claim 2, wherein the calculation rule includes an engine including a plurality of scripted rules configured to perform a transaction-based function.

6. A computer-implemented method, comprising:
receiving a calculation rule presented in an expression language and specifying one or more functions, the expression language allowing for each of a plurality of functions performable on a plurality of different platforms to be expressed using a common syntax; wherein the different platforms comprise: a structured query language (SQL) platform that accesses a SQL database in which dimensions and data models are represented as a plurality of tables and a multi-dimensional database platform that accesses a multi-dimensional database in which the dimensions and the data models are stored in a multi-dimensional structure;
identifying a selected platform on which the calculation rule is to be executed;
resolving the calculation rule to attributes of a data model in the selected platform to apply the calculation rule to the data model; wherein resolving the calculation rule comprises determining when the calculation rule accesses more information than the data model provides and determining when to eliminate the calculation rule based on this determination;
responding to whether the calculation rule is data-driven, including:
when the calculation rule is data-driven, determining a condition specified by the calculation rule and performing an action specified by the calculation rule based on the condition; and when the calculation rule is not data-driven, performing the action specified by the calculation rule;
executing the calculation rule by performing the one or more functions specified in the calculation rule; and
reporting the results from executing the calculation rule.

7. The computer-implemented method of claim 6, wherein the expression language provides for the calculation rule to include one or more variables resolvable when the calculation rule is applied to the data model.

8. The computer-implemented method of claim 6, wherein the expression language provides for the calculation rule to include one or more parameters solicited from a user when the calculation rule is applied to the data model.

9. The computer-implemented method of claim 6 wherein the identifying of the selected platform comprises receiving a user input identifying the selected platform.

10. The computer-implemented method of claim 6, wherein the identifying of the selected platform comprises automatically identifying the selected platform.

11. The computer-implemented method of claim 6, further comprising evaluating data maintained in the data model to determine whether the data model maintains data referenced in the one or more functions before executing the calculation rule.

12. The computer-implemented method of claim 6, further comprising retrieving the calculation rule from a store of previously-created calculation rules.

13. The computer-implemented method of claim 12, wherein the calculation rule includes an engine including a plurality of scripted calculation rules configured to perform a transaction-based function.

14. The computer-implemented method of claim 6, further comprising creating the calculation rule, wherein the calculation rule is derived from one or more rule types that correspond with a form one or more data types used in creating the data model.

15. A system, comprising:
 a processor and a computer-readable storage medium;
 a rule interface using the processor that is configured to receive a calculation rule presented in a multi-platform expression language to be applied to a data model, the calculation rule being received by one or more of:
 retrieving the calculation rule from a store of previously-created calculation rules; and
 accepting user entry of the calculation rule; and
 a run-time system configured to:
 receive the calculation rule from the rule interface;
 identify a database platform supporting the data model; wherein the database platform is selected from a group of platforms comprising: a structured query language (SQL) platform that accesses a SQL database in which dimensions and data models are represented as a plurality of tables and a multi-dimensional database platform that accesses a multi-dimensional database in which the dimensions and the data models are stored in a multi-dimensional structure;
 identify whether the calculation rule includes one more unresolved terms; upon identifying the calculation rule includes one or more unresolved terms, resolving the unresolved terms;
 adjust the calculation rule for execution on the data model;
 wherein adjusting the calculation rule comprises determining when the calculation rule accesses more information than the data model provides and determining when to eliminate the calculation rule based on this determination; and
 identifying whether the calculation rule is data-driven, including: when the calculation rule is data-driven, determining a condition specified by the calculation rule and performing an action specified by the calculation rule based on the condition; and when the calculation rule is not data-driven, performing the action specified by the calculation rule.

16. The system of claim 15, wherein the run-time system further comprises a preprocessor configured to adjust the calculation rule to operate based on a dimensionality of the data model.

17. The system of claim 15, wherein the identifying of the database platform is performed one of:
 by receiving a user input identifying the database platform; and
 automatically identifying the database platform.

18. The system of claim 15, wherein the one or more unresolved terms include:
 a variable resolvable to the data model; and
 a parameter to be solicited from a user.

19. The system of claim 15, further comprising a type library, including:
 one or more rule types from which the calculation rule is derived; and
 one or more data types from which members of the data model are derived, variable resolvable to the data model,
wherein the rule types and the data types are configured to correspond to facilitate application of the calculation rule to the data model.

\* \* \* \* \*